US007986267B2

(12) United States Patent
del Castillo et al.

(10) Patent No.: US 7,986,267 B2
(45) Date of Patent: Jul. 26, 2011

(54) METHOD AND SYSTEM FOR CUSTOMIZED FULL EPHEMERIS COMPATIBLE WITH STANDARD AGPS NETWORK DEVICES

(75) Inventors: Manuel del Castillo, Madrid (ES); Andrei Kosolobov, San Jose, CA (US); Javier de Salas Lasagabaster, Madrid (ES)

(73) Assignee: Broadcom Corporation, Irvine, CA (US)

( * ) Notice: Subject to any disclaimer, the term of this patent is extended or adjusted under 35 U.S.C. 154(b) by 132 days.

(21) Appl. No.: 12/250,329

(22) Filed: Oct. 13, 2008

(65) Prior Publication Data

US 2010/0090892 A1   Apr. 15, 2010

(51) Int. Cl.
*G01S 19/09* (2010.01)
*G01S 19/42* (2010.01)
*G01S 19/25* (2010.01)
(52) U.S. Cl. .......... 342/357.46; 342/357.25; 342/357.64
(58) Field of Classification Search ............. 342/357.06, 342/357.09, 357.12, 357.15, 357.25, 357.43, 342/357.46, 357.64; 701/207, 213
See application file for complete search history.

(56) References Cited

U.S. PATENT DOCUMENTS

| | | | |
|---|---|---|---|
| 6,683,564 B1 | 1/2004 | McBurney | |
| 2007/0046532 A1* | 3/2007 | Bucknor et al. | 342/357.09 |
| 2007/0293243 A1* | 12/2007 | Shyr et al. | 455/456.2 |
| 2007/0296573 A1* | 12/2007 | Schlesier et al. | 340/539.13 |
| 2009/0189811 A1* | 7/2009 | Tysowski et al. | 342/357.15 |

FOREIGN PATENT DOCUMENTS

EP   1 950 581 A1   7/2008

OTHER PUBLICATIONS

European Patent Office, Communication with European Search Report, dated May 20, 2010, in Application No. 09012709.3.

* cited by examiner

*Primary Examiner* — Dao L Phan
(74) *Attorney, Agent, or Firm* — McAndrews, Held & Malloy, Ltd.

(57) ABSTRACT

Aspects of a method and system for customized full ephemeris compatible with standard AGPS network devices allows a GPS enabled handset to receive real-time full ephemeris from an AGPS server for calculating a position fix. The real-time full ephemeris may be generated at the AGPS server in response to one or more request for real-time full ephemeris from the GPS enabled handset. The AGPS server may be configured to provide fresh full ephemeris generated at smaller intervals such as every 10-15 minutes as approximated real-time full ephemeris. The generated real-time full ephemeris or fresh full ephemeris may be communicated to the GPS enabled handset periodically or aperiodically. Various predicted real-time full ephemeris or predicted fresh full ephemeris compatible with various standards may be generated via Short Term Orbits (STO) technology.

20 Claims, 5 Drawing Sheets

METHOD AND SYSTEM FOR CUSTOMIZED FULL EPHEMERIS COMPATIBLE WITH STANDARD AGPS NETWORK DEVICES

CROSS-REFERENCE TO RELATED APPLICATIONS/INCORPORATION BY REFERENCE

Not applicable

FIELD OF THE INVENTION

Certain embodiments of the invention relate to signal processing for satellite navigation systems. More specifically, certain embodiments of the invention relate to a method and system for customized full ephemeris compatible with standard AGPS network devices.

BACKGROUND OF THE INVENTION

The market for Location-Based Services (LBS) is potentially tremendous. Location-Based Services may comprise services where information about the location of users or assets may be required. One of state-of-the art technology driving the LBS market today is Assisted GPS (AGPS). This technology combines satellite positioning and communication networks such as mobile networks to reach performance levels allowing the wide deployment of Location-Based Services. AGPS uses assistance data provided from an AGPS server via, for example, a mobile telephony network, to speed up the process of acquiring a position fix especially in a weak signal environment. The AGPS server has access to a reference network of GPS receivers that are placed in ideal locations (direct line-of-sight to satellites). The reference network may be used as a source for providing the assistance data. Depending on the AGPS server and GPS receiver capabilities, the assistance data may comprise various elements such as ephemeris data. The ephemeris data may be valid only for the visibility period of each detected satellite, which may be approximately 4 hours assuming that the receiver is static and the satellite is just rising above the horizon.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for generating temporary ephemeris, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for customized full ephemeris compatible with standard AGPS network devices. Various aspects of the invention may enable a GPS enabled handset to receive real-time full ephemeris assistance data from an AGPS server. The GPS enabled handset may generate location information based on the received real-time full ephemeris. The real-time full ephemeris may be generated at the AGPS server in response to one or more request for the real-time full ephemeris from the GPS enabled handset. The GPS enabled handset may communicate the one or more request for the real-time full ephemeris to the AGPS server over various communication networks. In return, the AGPS server may communicate the generated real-time full ephemeris to the GPS enabled handset. The AGPS server may be configured to provide fresh full ephemeris as approximated real-time full ephemeris by generating full ephemeris at much smaller intervals, which may be much less than a satellite ephemeris updating period. The generated real-time full ephemeris or fresh full ephemeris may be communicated to the GPS enabled handset, either periodically or aperiodically. Various predicted real-time full ephemeris or predicted fresh full ephemeris may be generated via Short Term Orbits (STO) technology. The generated STO data may be sent to the GPS enabled handset in a format compatible with GSM/UMTS, and/or WiFi, and/or WiMAX, and/or OMA SUPL.

Figure 1:
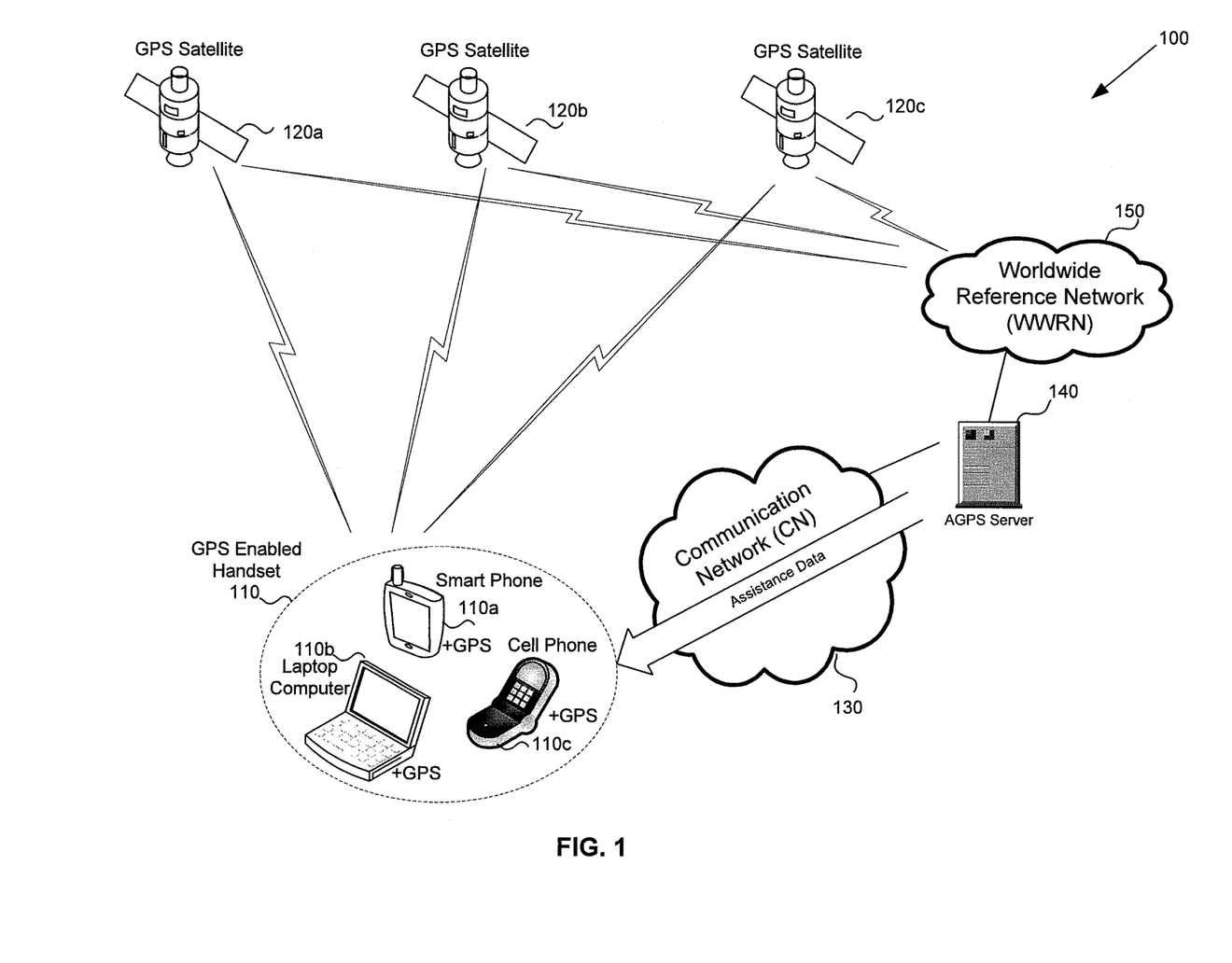
FIG. 1 is a diagram illustrating an exemplary assistance GPS satellite navigation system, in accordance with an embodiment of the invention.

FIG. 1 is a diagram illustrating an exemplary assistance GPS satellite navigation system, in accordance with an embodiment of the invention. Referring to FIG. 1, there is shown an AGPS satellite navigation system 100, comprising a GPS enabled handset 110, a plurality of satellites, of which satellites 120a, 120b, and 120c may be illustrated, a communication network 130, an AGPS server 140, and a WWRN 150.

The GPS enabled handset 110 may comprise suitable logic circuitry and/or code that may be enabled to receive satellite transmission signals from the GPS satellites 120a through 120c to determine the position of the GPS enabled handset 110. The GPS enabled handset 110 may be capable of transmitting and/or receiving radio signals across the communication network 130 such as, for example, 3GPP, 3GPP2, WiFi, and WiMAX. In order to determine a fast position fix, the GPS enabled handset 110 may be enabled to acquire AGPS assistance data from the AGPS server 140 via the communication network 130. In this regard, the GPS enabled handset 110 may be operable to generate one or more AGPS assistance data requests to the AGPS server 140, may be responded by the AGPS server 140 with real-time full ephemeris or fresh full ephemeris. The real-time full ephemeris may indicate the full ephemeris generated at the time when the AGPS server 140 may receive respective AGPS assistance data requests, while the fresh full ephemeris may represent the latest full ephemeris generated periodically with a small period of time of, for example, 10-15 minutes or so.

The GPS satellites 120a through 120c may comprise suitable logic, circuitry and/or code that may be enabled to generate and broadcast suitable radio-frequency (RF) signals. The broadcast RF signals may be received by a GPS satellite receiver integrated in the GPS enabled handset 110. The received broadcast RF signals may be utilized to determine a navigation information comprising, for example, position, velocity, and clock information of the GPS enabled handset 110. The broadcast RF signals may comprise full ephemeris information, which may be updated every two hours and valid for 4 hours.

The communication network 130 may comprise suitable logic, circuitry and/or code that may be enabled to provide various data services on a large-scale basis by using a particular technology such as Ethernet, GSM, UMTS, WiFi, or WiMAX. The communication network 130 may be a wired high-speed connection such as an Ethernet network, or may be a wireless network such as, for example, a GSM network, or a WiFi network, or a WiMAX network.

The AGPS server 140 may comprise suitable logic, circuitry and/or code that may have access to a GPS reference network such as, for example, the WWRN 150, to collect GPS satellite data by tracking GPS constellations through the WWRN 150. The AGPS server 140 may be enabled to generate AGPS assistance data, which may be communicated to the GPS enabled handset 110 such as the cell phone 110c to compute its location. In addition, the AGPS server 140 may be enabled to use Short Term Orbits (STO) technology to provide accurate AGPS assistance data for all healthy satellites, which may be valid for 4 hours or 6 hours, for instance, in the future. This may enable the benefits of AGPS technology to be realized by the GPS enabled device 110 when the GPS enabled device may temporarily be out of range of the communication network 130.

The AGPS assistance data may comprise various elements such as full ephemeris data. The life cycle of the full ephemeris may be 2 hours and may be extended to 4 hours, for instance, via STO. Devices that utilize the full ephemeris for navigation may simultaneously request new full ephemeris from the AGPS server 140. Since many devices may simultaneously execute the request for full ephemeris, this may result in a peak load at the AGPS server 140. In this regard, the AGPS server 140 may be enabled to provide customized full ephemeris by generating full ephemeris in real time for every user and predicting the customized full ephemeris for next 4 or 6 hours, for example, starting at the time where respective connections may be set up for AGPS assistance data. Different users may connect to the AGPS server 140 at different times. This may help the distribution to load on the AGPS server 140.

Instead of generating full ephemeris in real time, the AGPS server 140 may be configured to generate full ephemeris at much smaller time intervals, for example, every 10-15 minutes or so and predict the full ephemeris for next 4 or 6 hours, for example, starting at the points corresponding to the beginnings of respective time intervals. The latest generated full ephemeris (the fresh full ephemeris) may be delivered in response to respective AGPS assistance data requests. At the AGPS server 140, the validation time period associated with generated real-time full ephemeris or fresh full ephemeris may be configurable, for example, 4 hours, 6 hours, and up to 10 days. The predicted real-time full ephemeris or the predicted fresh full ephemeris associated with shorter validation time such as 4 hours or 6 hours may be called Short Term Orbits (STO) technology.

The AGPS server 140 may communicate with the communication network 130 via either a user-plane or a control-plane to deliver the generated up-to-date AGPS assistance data to corresponding users. The AGPS server 140 may support messaging in exemplary formats that may be compatible with telecommunication networks such as GSM/UMTS, CDMA, WiFi, WiMAX, and variants thereof. For example, the AGPS server 140 may be GSM/UMTS standard compliant by supporting messaging in RRLP format, PCAP interface and OMA SUPL v1.0.

The WWRN 150 may comprise suitable logic, circuitry and/or code that may be enabled to collect and distribute data for GPS satellites such as 120a through 120c on a continuous basis. The WWRN 150 may comprise a plurality of GPS reference receivers located around the world to provide AGPS coverage all the time in both home network and visited network. The WWRN 150 may users of GPS enabled devices such as the GPS enabled handset 110 to roam with their LBS anywhere in the world. The WWRN 150 may ensure high levels of availability, reliability, and performance.

In operation, the GPS enabled handset 110 may need full ephemeris information for navigation and may generate an AGPS assistance data request to the AGPS server 140 for required full ephemeris. For example, the GPS enabled handset 110 may be executing a task and may need to compute a position fix more quickly. Accordingly, the GPS enabled handset 110 may request the request full ephemeris assistance data from the AGPS server 140. The full ephemeris assistance data may be generated at the AGPS server 140 based on the GPS satellite data collected through the WWRN 150. To minimize and optimize assistance data request load on the AGPS server 140, the AGPS server 140 may generate and provide real-time full ephemeris assistance data every time it receives an ephemeris assistance data request from a GPS enabled device. The AGPS server 140 may also be configured to provide fresh full ephemeris in response to the AGPS assistance data request from the user. In instances when STO may be enabled, the generated AGPS assistance data, real-time full ephemeris or fresh full ephemeris, may be in the form of STO valid for 6 hours, for example. The AGPS server 140 may communicate the generated AGPS assistance data with the GPS enabled handset 110 in either a user-plan or a control-plane via the communication network 130 which may be GSM/UMTS, and/or WiFi, and/or WiMAX. The GPS enabled handset 110 may use the generated AGPS assistance data to calculate a position fix even when it may be temporarily out of network range.

Figure 2A:
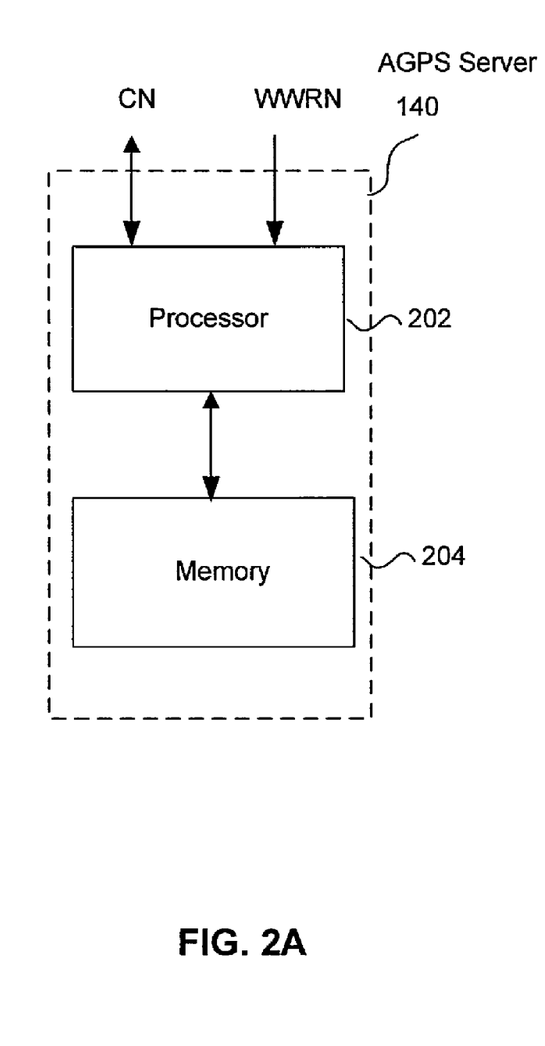
FIG. 2A is a diagram illustrating an exemplary AGPS server, in accordance with an embodiment of the invention.

FIG. 2A is a diagram illustrating an exemplary AGPS server, in accordance with an embodiment of the invention. Referring to FIG. 2, there is shown an AGPS server 140 comprising a processor 202, memory and/or storage 204.

The processor 202 of the AGPS server 140 may comprise suitable logic, circuitry and/or code that may be enabled to generate AGPS assistance data based on GPS satellite data collected from a GPS reference network such as, for example, the WWRN 150. The AGPS assistance data may comprise elements such as full ephemeris generated in real-time whenever a request for AGPS assistance data is received from a user. The full ephemeris may also be generated at short time intervals, for example, every 10-15 minutes or so, and the fresh full ephemeris may be provided to a GPS enabled device whenever an AGPS assistance data request is received from the GPS enable device by the AGPS server 140. The processor 202 may be enabled to communicate with, for example, the communication network 130 by using various network interfaces such as 3G in either a user-plane (data transmission) or a control-plane (signaling) to delivery up-to-date AGPS assistance data such as real-time full ephemeris or fresh full ephemeris, and/or respective STO, to corresponding user terminals such as the GPS enabled device 110.

The memory 204 may comprise suitable logic, circuitry, and/or code that enable storing information such as executable instructions and data that may be utilized by the processor 202. The executable instructions may comprise algorithms that may be enabled to calculate assistance data using acquired satellite data from the WWRN 150 automatically or upon request/signaled. The data may comprise various calculated assistance data. The memory 204 may comprise RAM, ROM, low latency nonvolatile memory such as flash memory and/or other suitable electronic data storage.

In operation, a navigating GPS enable device such as the GPS enabled handset 110 may be enabled to request AGPS assistance data from the AGPS server 140. The processor 202 of the AGPS server 140 may be enabled to respond to the request for up-to-date AGPS assistance data. The response may comprise AGPS assistance data calculated by the processor 202 and resident in the memory 204. The processor 202 may be enabled to provide either real-time full ephemeris assistance data or fresh full ephemeris assistance data together with respective STO to the GPS enabled handset 110. The STO data may be valid for 4 hours or 6 hours, for example. The processor 202 may communicate with the communication network 130 in either a user-plane or a control-plane to delivery up-to-date AGPS assistance data to corresponding user terminals such as the GPS enabled device 110, accordingly.

Figure 2B:
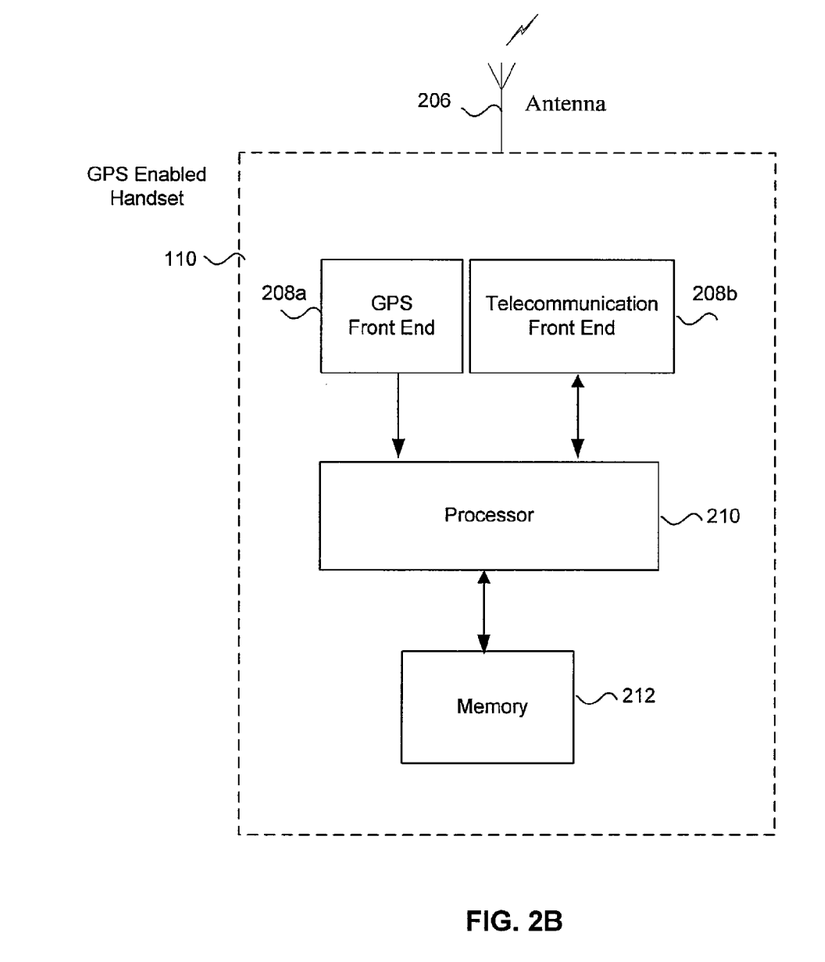
FIG. 2B is a diagram illustrating an exemplary GPS enabled device, in accordance with an embodiment of the invention.

FIG. 2B is a diagram illustrating an exemplary GPS enabled device, in accordance with an embodiment of the invention. Referring to FIG. 2B, there is shown the GPS enabled handset 110 comprising an antenna 206, a GPS front end 208a, a telecommunication front end 208b, a processor 210, and a memory 212.

The antenna 206 may comprise suitable logic, circuitry and/or code that may be enabled to receive L band signals from a plurality of GPS satellites such as the GPS 120a through 120c and may be capable of transmitting and/or receiving radio signals over, for example, the 3G radio communication system, for communications among 3G devices.

The GPS front end 208a may comprise suitable logic, circuitry and/or code that may be enabled to receive GPS satellite broadcast signals via the antenna 206 and convert them to GPS baseband signals, which may be suitable for further processing in the processor 210 for a navigation solution, whether GPS based or AGPS based.

The telecommunication front end 208b may comprise suitable logic, circuitry and/or code that may be enabled to transmit and/or receive radio signals over a telecommunication network such as a 3G network via the antenna 206 and convert them to corresponding baseband signals, which may be suitable for further processing in the processor 210. In this regard, the received radio signals may comprise AGPS assistance data with various elements such as real-time full ephemeris or fresh full ephemeris, generated from the AGPS server 140 in response to an AGPS assistance data request from the user. In instances where STO technology may be enabled at the AGPS server 140, the received AGPS assistance data may comprise STO, for instance.

The processor 210 may comprise suitable logic, circuitry and/or code that may be enabled to process received satellite signals as well as signals received from a telecommunication network. The processor 210 may be configured to extract navigational information from each received satellite signal to compute a position fix for the GPS enabled handset 110. The processor 210 may be programmed to calculate the position fix by combining local GPS measurements and AGPS assistance data comprising real-time full ephemeris or fresh full ephemeris. When STO assistance data may be available, the processor 210 may be enabled to calculate a position fix for the GPS enabled handset 110 based on local GPS measurements and the STO assistance data even without a network connection between the GPS enabled handset 110 and the AGPS server 140.

The memory 212 may comprise suitable logic, circuitry, and/or code that may enable storing of information such as executable instructions and data that may be utilized by the processor 210. The executable instructions may comprise algorithms that may be applied to calculate a position fix using local GPS measurements and the AGPS assistance data or the STO assistance data from the AGPS server 140. The data may comprise local GPS measurements and AGPS assistance data or the STO assistance data. The local GPS measurements may be associated to the satellite signals directly received from the GPS satellite 120a through 120c. The AGPS assistance data or the STO assistance data may be from the AGPS server 140 and received through the telecommunication front end 206b via the communication network 130. The memory 212 may comprise RAM, ROM, low latency nonvolatile memory such as flash memory and/or other suitable electronic data storage.

In operation, a plurality of signals may be received at the antenna 206 coupled to the GPS enabled handset 110. The received plurality of signals may be measured and communicated to the GPS front end 208a or the telecommunication front end 208b, respectively, depending on the type of received signals. The GPS front end 208a may convert the received GPS signals into corresponding baseband signals and pass to the processor 210. The telecommunication front end 208b may convert the received telecommunication signals into corresponding baseband signals and pass to the processor 210. The received telecommunication signals may comprise AGPS assistance data comprising real-time full ephemeris or fresh full ephemeris generated from the AGPS server 140. The AGPS assistance data may also comprise STO assistance data when STO is enabled. The received AGPS assistance data may be stored in the memory 212. In instances where the user of the GPS enabled handset 110 may need to calculate its position fix, the processor 206 may determine a position fix for the GPS enabled handset 110 based on the AGPS assistance data stored in the memory 210, and the local GPS measurements from the GPS front end 204a, respectively.

Figure 3:
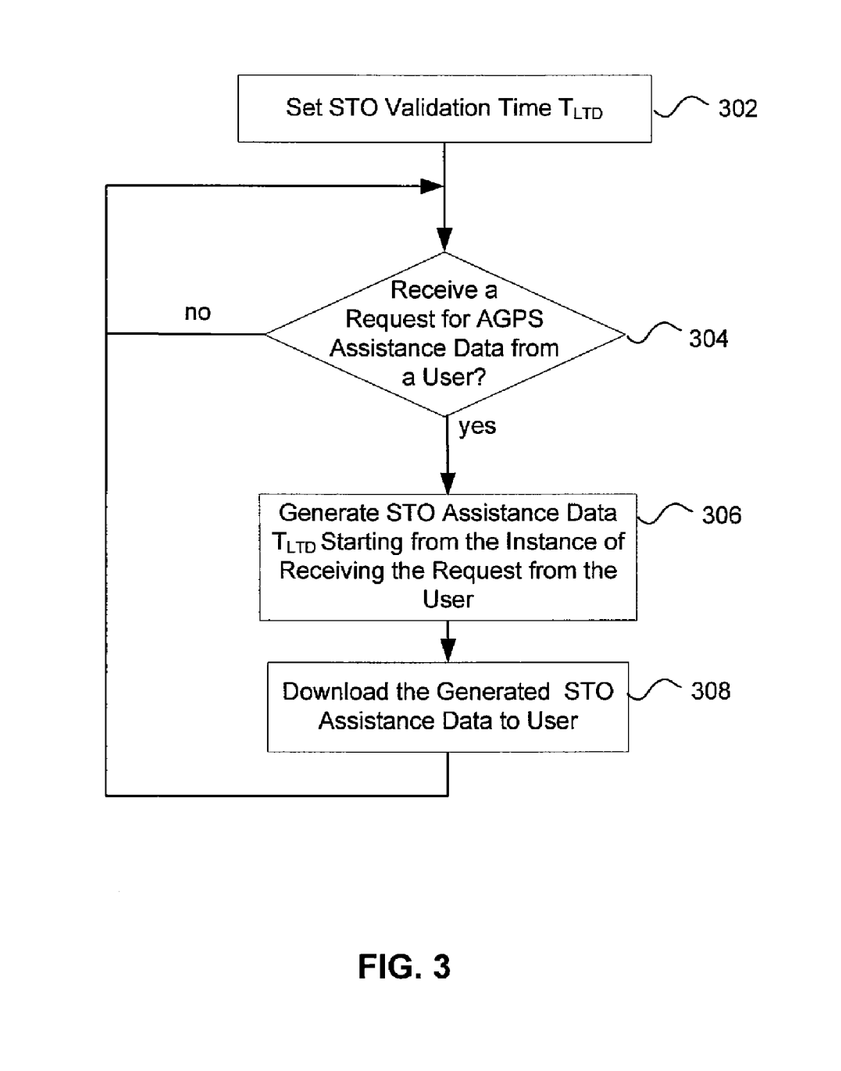
FIG. 3 is an exemplary flow chart illustrating real-time full ephemeris assistance data acquisition procedure, in accordance with an embodiment of the invention.

FIG. 3 is an exemplary flow chart illustrating real-time full ephemeris assistance data acquisition procedure, in accordance with an embodiment of the invention. Referring to FIG. 3, where the exemplary steps may start with the step 302, where the AGPS server 140 may be configured by setting STO assistance data validation time $T_{STO}$ which may be 4 hours and 6 hours, for example. In step 304, the AGPS server 140 may determine whether a request for AGPS assistance data may be received from handsets such as the GPS enabled handset 110. In instances where a request for AGPS assistance data may be received from the GPS enabled handset 110c, then in step 306, the AGPS server 140 may generate STO assistance data starting from the instance of receiving the AGPS assistance data request from the user of GPS enabled handset 110c. The generated STO assistance data may comprise full ephemeris which may be valid for $T_{STO}$. The full ephemeris may be generated in real-time starting at the time when the AGPS server 140 may receive the request from the GPS enabled handset 110c. In step 308, the GPS enabled handset 110c may receive the generated STO assistance data from the AGPS server 140. The exemplary steps may go back to the step 304 for processing the next AGPS assistance data request. In step 304, in instances where no request for AGPS assistance data may be received at the AGPS server 140, then the exemplary steps may remain in step 304.

Figure 4:
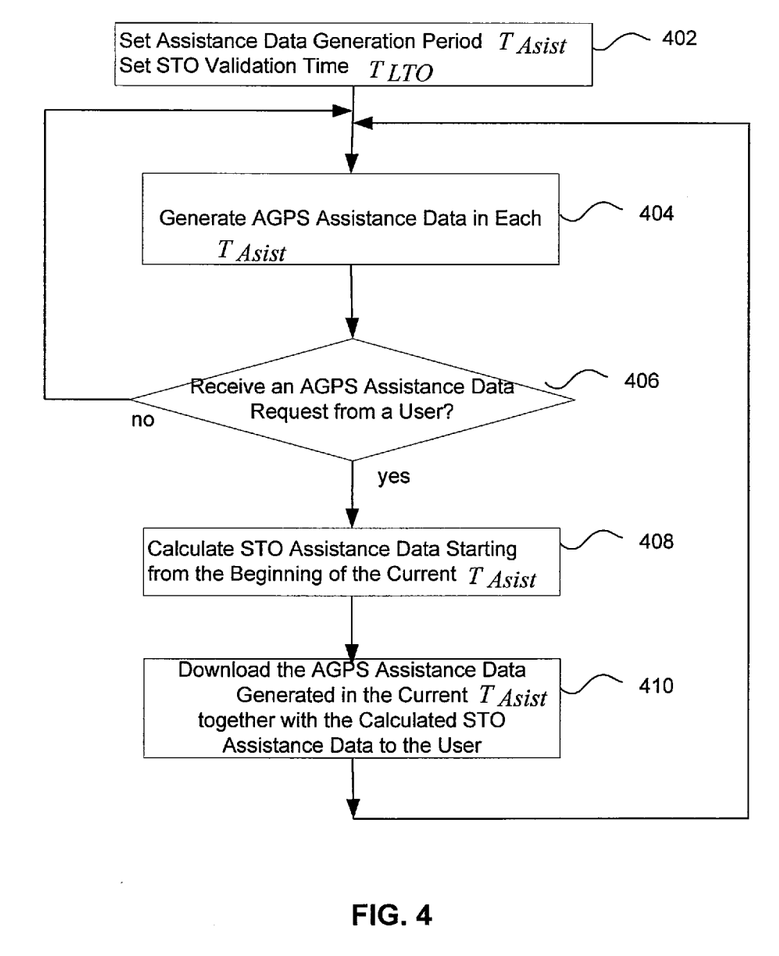
FIG. 4 is an exemplary flow chart illustrating fresh full ephemeris assistance data acquisition procedure, in accordance with an embodiment of the invention.

FIG. 4 is an exemplary flow chart illustrating fresh full ephemeris assistance data acquisition procedure, in accordance with an embodiment of the invention. Referring to FIG. 4, where the exemplary steps may start with the step 402, where the AGPS server 140 may be configured by setting STO assistance data validation time $T_{STO}$ and an assistance data generation period $T_{Asist}$. In step 404, the AGPS server 140 may generate AGPS assistance data (full ephemeris) every assistance data generation period $T_{Asist}$. In step 406, the AGPS server 140 may determine whether a request for GPS assistance data may be received from handsets such as the GPS enabled handset 110. In instances where a request for AGPS assistance data may be received from the GPS enabled handset 110c, then in step 408, the AGPS server 140 may calculate STO assistance data starting from the beginning of the current assistance data generation period $T_{Asist}$. The calculated STO data may be valid in $T_{STO}$. In step 410, the AGPS server 140 may communicate with the GPS enabled handset 110c by downloading the fresh (latest) generated STO assistance data (full ephemeris) to the GPS enabled handset 110c. The exemplary steps may go back to the step 404. In step 406, in instances where no request for GPS assistance data may be received, then the exemplary steps may remain in step 404.

Aspects of a method and system for customized full ephemeris compatible with standard AGPS network devices are provided. In accordance with various embodiments of the invention, the AGPS server 140 may be enabled to generate real-time full ephemeris assistance data to provide to one or more assistance data requests from, for example, the GPS enabled handset 110. The Short Term Orbits (STO) information may be used by the AGPS server 140 to generate real-time full ephemeris based on the satellite data collected through the WWRN 150. The period for which the generated real-time full ephemeris is valid may be configurable and may be 4 hours or 6 hours, for example. The AGPS server 140 may be enabled to generate full ephemeris at an instance of receiving the one or more assistance data requests as described in FIG. 3. The AGPS server 140 may also be configured to generate the full ephemeris every 10-15 minutes or so, and this period may be much less than the GPS satellite ephemeris information updating period of 2 hours. The fresh (the latest generated) full ephemeris may be used to approximate the real-time full ephemeris in responsive to the one or more assistance data requests as described in FIG. 4. The generated real-time full ephemeris or the generated fresh full ephemeris may be delivered to respective users over the communication network 130 in formats compatible with GSM/UMTS, and/or WiFi, and/or WiMAX, and/or OMA SUPL, for example.

In accordance with various embodiments of the invention, the GPS enabled handset 110 may receive real-time full ephemeris assistance data from an AGPS server 140. The GPS enabled handset 110 may generate location information based on the received real-time full ephemeris. The real-time full ephemeris may be generated at the AGPS server 140 in response to one or more request for the real-time full ephemeris from the GPS enabled handset 110. The GPS enabled handset 110 may communicate the one or more request for the real-time full ephemeris to the AGPS server 140 over various communication networks such as the communication network 130. In return, the AGPS server 140 may communicate the generated real-time full ephemeris to the GPS enabled handset 110.

The AGPS server 140 may be configured to provide fresh full ephemeris as approximated real-time full ephemeris by generating full ephemeris at much smaller intervals, which may be much less than a satellite ephemeris updating period. The generated real-time full ephemeris or fresh full ephemeris may be communicated to the GPS enabled handset 110, either periodically or aperiodically. Various predicted real-time full ephemeris or predicted fresh full ephemeris may be generated, utilizing, for example, Short Term Orbits (STO) technology. The generated STO data may be sent to the GPS enabled handset 110 in a format compatible with GSM/UMTS, and/or WiFi, and/or WiMAX, and/or OMA SUPL.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for customized full ephemeris compatible with standard AGPS network devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
receiving at a GPS enabled device, real-time full ephemeris from an AGPS server, wherein said real-time full ephemeris is generated, by said AGPS server, in response to a request from said GPS enabled device; and
generating at said GPS enabled device, location information based on said real-time full ephemeris received from said AGPS server.

2. The method according to claim 1, comprising generating by said GPS enabled device, one or more request for said real-time full ephemeris.

3. The method according to claim 2, comprising communicating said generated one or more request for said real-time full ephemeris from said GPS enabled device to said AGPS server.

4. The method according to claim 3, wherein said AGPS server communicates said real-time full ephemeris to said GPS enabled device in response to said generated one or more requests.

5. The method according to claim 2, wherein said AGPS server generates full ephemeris periodically and communicates most current said generated full ephemeris to said GPS enabled device in response to said generated one or more requests.

6. The method according to claim 2, wherein said AGPS server generates said real-time full ephemeris and periodically communicates said generated real-time full ephemeris to said GPS enabled device.

7. The method according to claim 2, wherein said AGPS server generates said real-time full ephemeris and aperiodically communicates said generated real-time full ephemeris to said GPS enabled device.

8. The method according to claim 2, wherein said AGPS server generates said real-time full ephemeris based on Short Term Orbits (STO) information.

9. The method according to claim 2, wherein said AGPS server generates said real-time full ephemeris at a time period that is less than a satellite ephemeris updating period.

10. The method according to claim 1, wherein said real-time full ephemeris comprises a format that is compatible with GSM/UMTS, and/or WiFi, and/or WiMAX, and/or OMA SUPL.

11. A system for processing signals, the system comprising:
  one or more circuits for use in a GPS enabled device, said one or more circuits operable to receive real-time full ephemeris from an AGPS server, wherein said real-time full ephemeris is generated, by said AGPS server, in response to a request from said GPS enabled device; and
  said one or more circuits operable to generate at said GPS enabled device, location information based on said real-time full ephemeris received from said AGPS server.

12. The system according to claim 11, wherein said one or more circuits are operable to generate one or more request for said real-time full ephemeris.

13. The system according to claim 12, wherein said one or more circuits are operable to communicate said generated one or more request for said real-time full ephemeris from said GPS enabled device to said AGPS server.

14. The system according to claim 13, wherein said AGPS server communicates said real-time full ephemeris to said GPS enabled device in response to said generated one or more requests.

15. The system according to claim 12, wherein said AGPS server generates full ephemeris periodically and communicates most current said generated full ephemeris to said GPS enabled device in response to said generated one or more requests.

16. The system according to claim 12, wherein said AGPS server generates said real-time full ephemeris and periodically communicates said generated real-time full ephemeris to said GPS enabled device.

17. The system according to claim 12, wherein said AGPS server generates said real-time full ephemeris and aperiodically communicates said generated real-time full ephemeris to said GPS enabled device.

18. The system according to claim 12, wherein said AGPS server generates said real-time full ephemeris based on Short Term Orbits (STO) information.

19. The system according to claim 12, wherein said AGPS server generates said real-time full ephemeris at a time period that is less than a satellite ephemeris updating period.

20. The system according to claim 11, wherein said real-time full ephemeris comprises a format that is compatible with GSM/UMTS, and/or WiFi, and/or WiMAX, and/or OMA SUPL.

* * * * *